United States Patent
Chen et al.

(10) Patent No.: US 9,733,396 B2
(45) Date of Patent: Aug. 15, 2017

(54) TOUCH PANEL AND METHOD FOR MANUFACTURING THE SAME

(71) Applicant: Henghao Technology Co., Ltd., Hsinchu County (TW)

(72) Inventors: Ting-Chieh Chen, Hsinchu County (TW); Chun-Kai Chang, Hsinchu County (TW)

(73) Assignee: Henghao Technology Co., Ltd., Hsinchu County (TW)

( * ) Notice: Subject to any disclaimer, the term of this patent is extended or adjusted under 35 U.S.C. 154(b) by 0 days.

(21) Appl. No.: 14/521,446

(22) Filed: Oct. 22, 2014

(65) Prior Publication Data
US 2015/0109228 A1    Apr. 23, 2015

(30) Foreign Application Priority Data
Oct. 23, 2013    (TW) .............................. 102138341 A

(51) Int. Cl.
*G06F 3/041*    (2006.01)
*G06F 3/044*    (2006.01)
*G02B 1/11*    (2015.01)

(52) U.S. Cl.
CPC ................ *G02B 1/11* (2013.01); *G06F 3/041* (2013.01); *G06F 2203/04103* (2013.01); *Y10T 29/49105* (2015.01)

(58) Field of Classification Search
CPC .......... G06F 3/041; G06F 3/044; G06F 3/045; G02F 1/133
See application file for complete search history.

(56) References Cited

U.S. PATENT DOCUMENTS

| | | | |
|---|---|---|---|
| 6,914,640 B2* | 7/2005 | Yu | G02F 1/133 345/104 |
| 9,023,448 B2* | 5/2015 | Su | B32B 7/06 428/41.8 |
| 9,335,787 B2* | 5/2016 | Aurongzeb | G06F 1/1679 |

(Continued)

FOREIGN PATENT DOCUMENTS

| | | |
|---|---|---|
| CN | 102566806 A | 7/2012 |
| CN | 203133785 U | 8/2013 |

(Continued)

OTHER PUBLICATIONS

Office action was issued on May 8, 2015 from Taiwan Patent Office.
(Continued)

*Primary Examiner* — Ricardo L Osorio
(74) *Attorney, Agent, or Firm* — The PL Law Group, PLLC

(57) ABSTRACT

A method for manufacturing a touch panel includes the following steps. A touch-sensing unit is provided. A decoration layer is formed on the touch-sensing unit. And, a cover lens is disposed on the decoration layer. A touch panel is also provided. A touch panel includes a cover lens, a touch-sensing unit, and a first decoration layer separating the cover lens from the touch-sensing unit, wherein the first decoration layer and the touch-sensing unit have a first adhesive force per unit area therebetween, the first decoration layer and the cover lens have a second adhesive force per unit area therebetween, and the first adhesive force per unit area is greater than the second adhesive force per unit area.

18 Claims, 8 Drawing Sheets

(56) References Cited

U.S. PATENT DOCUMENTS

| | | | |
|---|---|---|---|
| 9,423,912 B2* | 8/2016 | Yin | G06F 3/041 |
| 2012/0235953 A1 | 9/2012 | Kim et al. | |
| 2014/0062912 A1* | 3/2014 | Lien | G06F 3/0412 |
| | | | 345/173 |
| 2014/0063373 A1* | 3/2014 | Wu | G02F 1/13338 |
| | | | 349/12 |
| 2014/0368755 A1* | 12/2014 | Chen | G06F 3/044 |
| | | | 349/12 |

FOREIGN PATENT DOCUMENTS

| | | |
|---|---|---|
| CN | 203689473 U | 7/2014 |
| JP | 2013030166 A | 2/2013 |
| JP | 2013-134782 A | 7/2013 |
| KR | 10-2011-0004233 U | 1/2011 |
| TW | M459454 U1 | 8/2013 |

OTHER PUBLICATIONS

Office action issued on Nov. 20, 2015 from Korean Intellectual Property Office in a counterpart Korean Patent Application.
Office action issued on Jan. 26, 2017 from China Patent Office in a counterpart China Patent Application No. 201310653729.4.

* cited by examiner

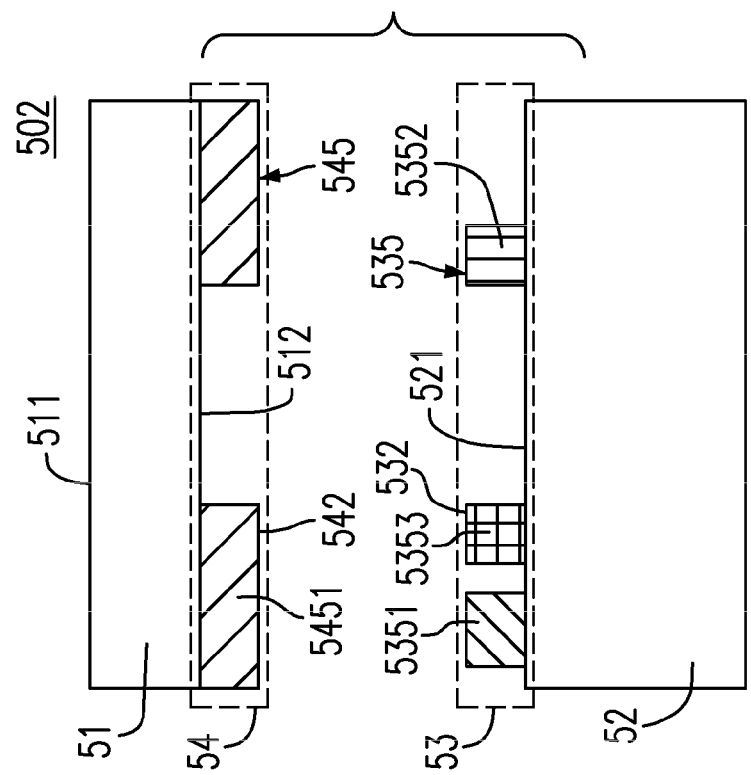
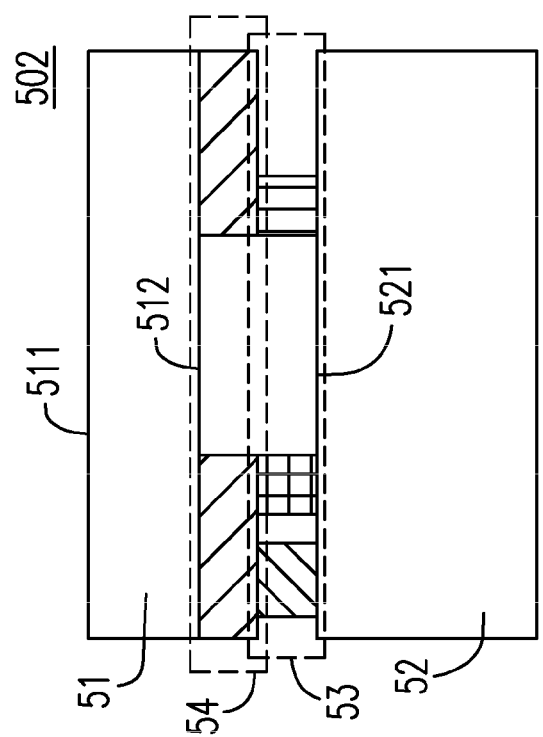
Fig. 7B
Fig. 7A

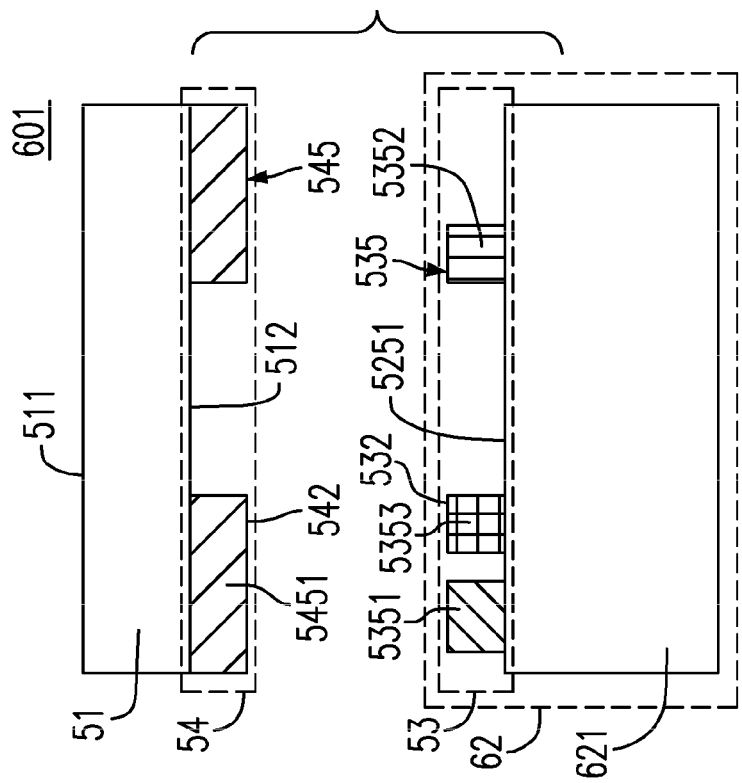
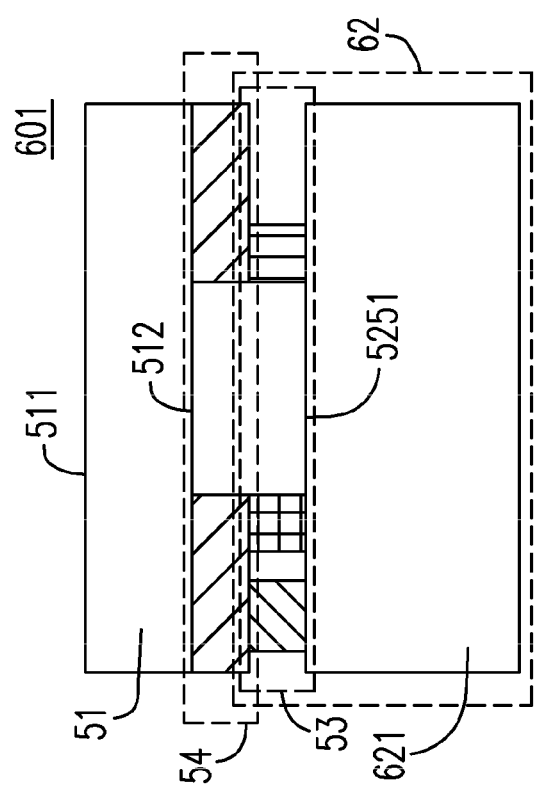
Fig. 9A
Fig. 9B

TOUCH PANEL AND METHOD FOR MANUFACTURING THE SAME

CROSS-REFERENCE TO RELATED APPLICATION AND CLAIM OF PRIORITY

The application claims the benefit of Taiwan Patent Application No. 102138341, filed on Oct. 23, 2013, at the Taiwan Intellectual Property Office, the disclosures of which are incorporated herein in their entirety by reference.

TECHNICAL FIELD

The present disclosure relates to a touch panel and a method for manufacturing the same and, more particularly, relates to a touch panel having a decoration layer and a method for manufacturing the same.

BACKGROUND

Please refer to FIG. 1, which is a schematic diagram showing a touch panel 10 in the prior art. The touch panel 10 includes a film layer 13, a film layer 12 disposed on the film layer 13, and a cover lens 11 disposed on the film layer 12, wherein the cover lens 11 includes a user interface surface 111, and is used to protect the film layers 12 and 13. As shown in FIG. 1, in general, it is necessary that the touch panel 10 including a touch sensor combines two sheets or more than two sheets of functional layers. The user side of the touch panel 10 employs the cover lens 11 to serve as an outermost protection layer.

Please refer to FIG. 2, which is a schematic diagram showing a touch panel 20 in the prior art. The touch panel 20 includes a film layer 22, and a cover lens 21 disposed on the film layer 22, wherein the cover lens 21 includes a user interface surface 211, and is used to protect the film layer 22. Please refer to FIG. 3, which is a schematic diagram showing a touch panel 30 in the prior art. The touch panel 30 includes a glass layer 32, and a cover lens 31 disposed on the glass layer 32, wherein the cover lens 31 includes a user interface surface 311, and is used to protect the glass layer 22.

Please refer to FIG. 4, which is a schematic diagram showing a touch panel 40 in the prior art. The touch panel 40 includes a touch sensor 42, and a cover lens structure 41 disposed on the touch sensor 42. The cover lens structure 41 includes a cover lens 45, and a decoration layer 46 printed on the cover lens 45. The cover lens 45 includes a user interface surface 451. The decoration layer 46 has a predetermined pattern, which includes at least one selected from a group consisting of a black matrix pattern, a logo pattern and an icon pattern. A patterned ink is placed on the cover lens 45 by a screen printing. The patterned ink is dried to form the decoration layer 46.

The touch panels 10, 20, 30 and 40 can have a further variation and effect.

SUMMARY OF EXEMPLARY EMBODIMENTS

It is an aspect of the present disclosure to provide an improved method of manufacturing a decoration layer to increase the precision that the decoration layer is disposed on a touch-sensing unit.

It is therefore an embodiment of the present disclosure to provide a touch panel. The touch panel includes a cover lens, a touch-sensing unit and a decoration layer. The decoration layer separates the cover lens from the touch-sensing unit. The decoration layer and the touch-sensing unit have a first adhesive force per unit area therebetween. The decoration layer and the cover lens have a second adhesive force per unit area therebetween. The first adhesive force per unit area is greater than the second adhesive force per unit area.

It is therefore another embodiment of the present disclosure to provide a touch panel. The touch panel includes a touch-sensing unit and a cover lens. The touch-sensing unit has a conductive layer, wherein the conductive layer has an adhering surface, and a decoration layer formed on the adhering surface. The cover lens is disposed on the touch-sensing unit, so that the decoration layer is disposed between the cover lens and the conductive layer.

It is therefore still another embodiment of the present disclosure to provide a method for manufacturing a touch panel. The method includes the following steps. A touch-sensing unit is provided. A decoration layer is formed on the touch-sensing unit. A cover lens is disposed on the decoration layer.

BRIEF DESCRIPTION OF THE DRAWINGS

The foregoing and other features and advantages of the present disclosure will be more clearly understood through the following descriptions with reference to the drawings, wherein:

FIG. 7A and FIG. 7B are schematic diagrams respectively showing an assembly form and a resolution form of a touch panel according to various embodiments of the present disclosure;

FIG. 9A and FIG. 9B are schematic diagrams respectively showing an assembly form and a resolution form of a touch panel according to various embodiments of the present disclosure.

DETAIL DESCRIPTION OF THE PREFERRED EMBODIMENTS

The present disclosure will now be described more specifically with reference to the following embodiments. It is to be noted that the following descriptions of preferred embodiments of this disclosure are presented herein for the purposes of illustration and description only; it is not intended to be exhaustive or to be limited to the precise form disclosed.

Figure 1:
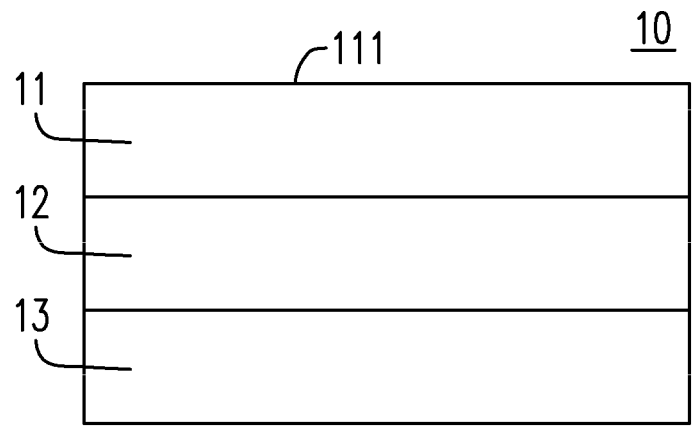
FIG. 1 is a schematic diagram showing a touch panel in the prior art.
Figure 2:
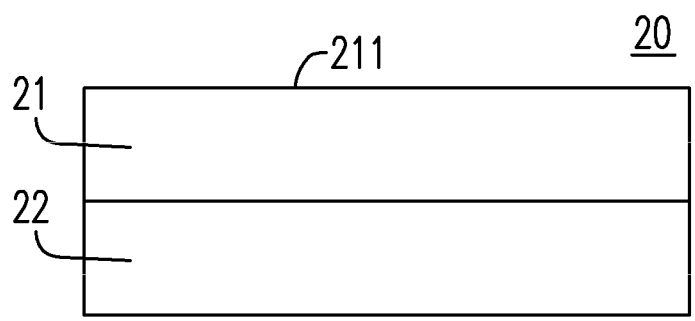
FIG. 2 is a schematic diagram showing a touch panel in the prior art.
Figure 3:
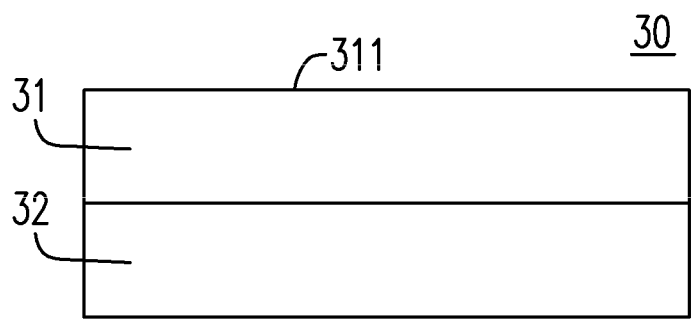
FIG. 3 is a schematic diagram showing a touch panel in the prior art.
Figure 4:
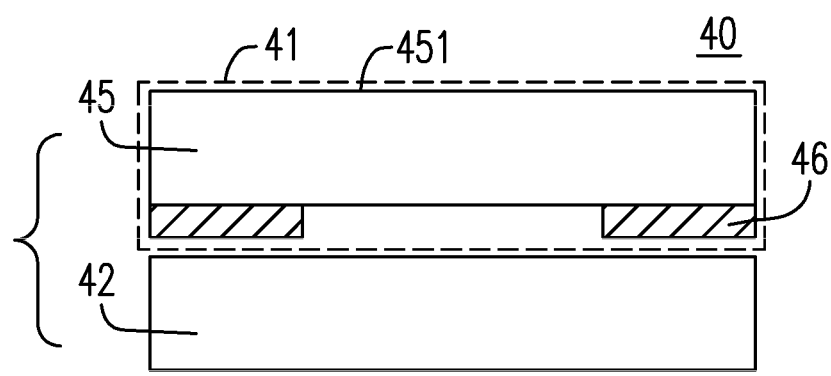
FIG. 4 is a schematic diagram showing a touch panel in the prior art.
Figure 5B:
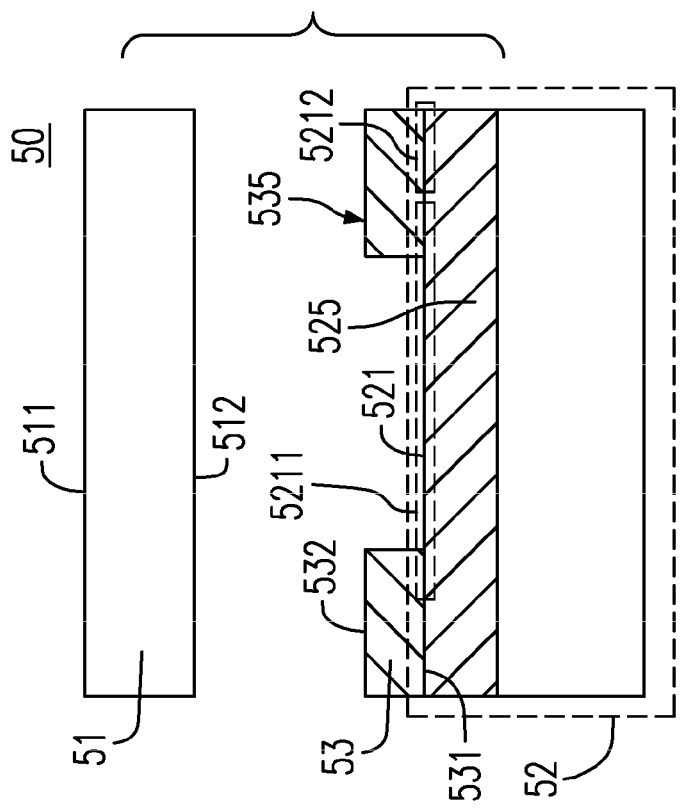
FIG. 5A and FIG. 5B are schematic diagrams respectively showing an assembly form and a resolution form of a touch panel according to various embodiments of the present disclosure.
Figure 5A:
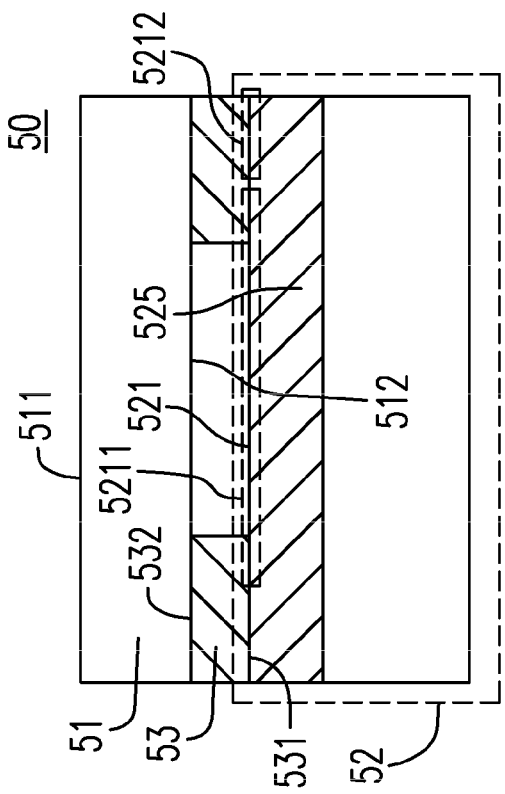

Please refer to FIG. 5A and FIG. 5B, which are schematic diagrams respectively showing an assembly form and a resolution form of a touch panel 50 according to various embodiments of the present disclosure. The touch panel 50 includes a cover lens 51, a touch-sensing unit 52 and a decoration layer 53. The decoration layer 53 separates the cover lens 51 from the touch-sensing unit 52. The decoration layer 53 and the touch-sensing unit 52 have a first adhesive force per unit area therebetween; the decoration layer 53 and the cover lens 51 have a second adhesive force per unit area therebetween; and the first adhesive force per unit area is greater than the second adhesive force per unit area.

In some embodiments, the decoration layer 53 is disposed between the cover lens 51 and the touch-sensing unit 52, and is coupled to each of the cover lens 51 and the touch-sensing unit 52. The cover lens 51 includes a user interface surface 511 and a surface 512 opposite to the user interface surface 511. The touch-sensing unit 52 includes a conductive surface 521 facing the surface 512 of the cover lens 51. The decoration layer 53 includes a surface 531 adhered to the conductive surface 521 of the touch-sensing unit 52, and a surface 532 opposite to the surface 531. The surface 531 of the decoration layer 53 and the conductive surface 521 of the touch-sensing unit 52 have the first adhesive force per unit area therebetween; and the surface 532 of the decoration layer 53 and the surface 512 of the cover lens 51 have the second adhesive force per unit area therebetween. The decoration layer 53 is printed on the conductive surface 521 of the touch-sensing unit 52 and has a predetermined pattern 535 including at least one selected from a group consisting of a black matrix pattern, a logo pattern, an icon pattern and a functional pattern.

In some embodiments, the decoration layer 53 is an opaque insulation layer. The cover lens 51 is a transparent insulation layer, is used to protect the touch-sensing unit 52, and is adhered to the decoration layer 53. In some embodiments, the surface 531 of the decoration layer 53 and the conductive surface 521 of the touch-sensing unit 52 have a first front-view contact area therebetween, and are bound with a first adhesive force at the first front-view contact area. The first adhesive force per unit area is a ratio of the first adhesive force to the first front-view contact area. The surface 532 of the decoration layer 53 and the surface 512 of the cover lens 51 have a second front-view contact area therebetween, and are bound with a second adhesive force at the second front-view contact area. The second adhesive force per unit area is a ratio of the second adhesive force to the second front-view contact area. For instance, the first adhesive force per unit area and the second adhesive force per unit area are a first direct adhesive force per unit area and a second direct adhesive force per unit area, respectively. For instance, the second front-view contact area is equal to the first front-view contact area.

In some embodiments, the touch-sensing unit 52 is a film sensor, and includes a conductive layer 525. For instance, the conductive layer 525 includes the conductive surface 521, and is a conductive wire layer for touch sensing. The conductive surface 521 of the touch-sensing unit 52 includes a transparent conductive surface 5211. The cover lens 51 and the transparent conductive surface 5211 of the touch-sensing unit 52 are separated by the decoration layer 53. In some embodiments, the conductive surface 521 of the touch-sensing unit 52 includes a transparent conductive surface 5211 and an opaque conductive surface 5212 coupled to the transparent conductive surface 5211.

For instance, the decoration layer 53 includes a first portion and a second portion extending from the first portion; the first portion of the decoration layer 53 is printed on the opaque conductive surface 5212; the second portion of the decoration layer 53 is printed on the transparent conductive surface 5211; and the decoration layer 53 separates the cover lens 51 from the opaque conductive surface 5212 of the touch-sensing unit 52. For instance, the conductive layer 525 of the touch-sensing unit 52 includes a transparent conductive portion and an opaque conductive portion coupled to the transparent conductive portion; and the transparent and the opaque conductive portions respectively include the transparent and the opaque conductive surfaces 5211 and 5212.

Figure 6B:
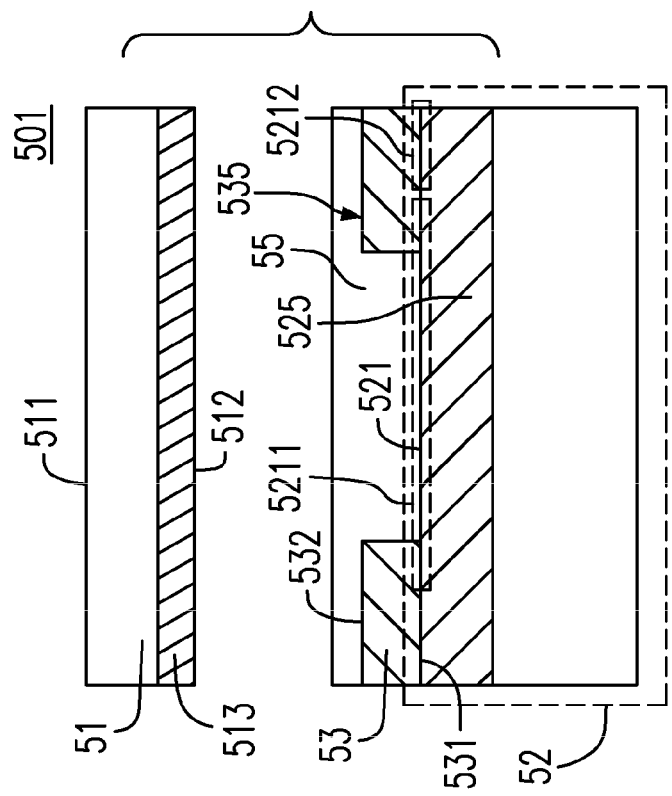
FIG. 6A and FIG. 6B are schematic diagrams respectively showing an assembly form and a resolution form of a touch panel according to various embodiments of the present disclosure.
Figure 6A:
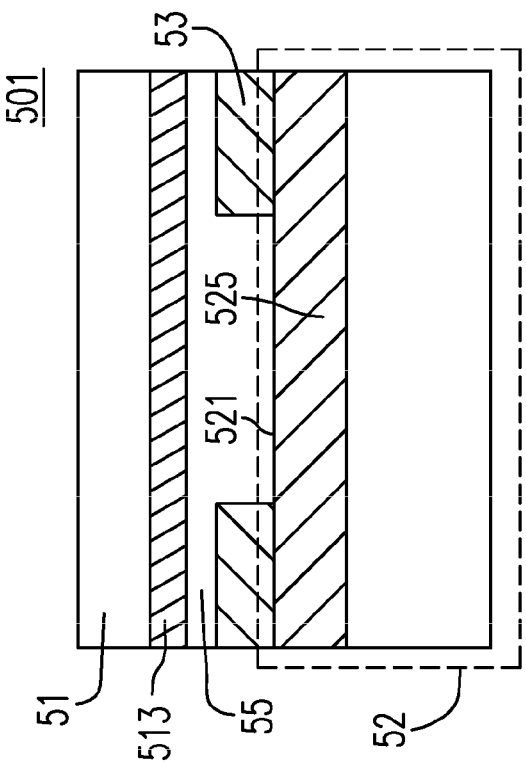

Please refer to FIG. 6A and FIG. 6B, which are schematic diagrams respectively showing an assembly form and a resolution form of a touch panel 501 according to various embodiments of the present disclosure. The structure of the touch panel 501 is similar to that of the touch panel 50 shown in FIGS. 5A and 5B. The differences between the touch panels 501 and 50 are described as follows. In FIGS. 6A and 6B, the touch panel 501 includes a cover lens 51, an adhesive layer 55, a touch-sensing unit 52 and a decoration layer 53. The cover lens 51 further includes an optical coating 513, which has a surface 512 opposite to the user interface surface 511 of the cover lens 51. The optical coating 513 is used to make a protection function including at least one selected from a group consisting of an anti-reflection, an anti-glare and an anti-static. In some embodiments, the adhesive layer 55 is disposed between the cover lens 51 and the decoration layer 53, and causes the cover lens 51 to be adhered to the decoration layer 53. For instance, the adhesive layer 55 is a planarization layer, and adheres to the surface 512 of the cover lens 51, the surface 532 of the decoration layer 53, and the conductive surface 521 of the touch-sensing unit 52.

Please refer to FIG. 7A and FIG. 7B, which are schematic diagrams respectively showing an assembly form and a resolution form of a touch panel 502 according to various embodiments of the present disclosure. The structure of the touch panel 502 is similar to that of the touch panel 50 shown in FIGS. 5A and 5B. The differences between the touch panels 502 and 50 are described as follows. In FIGS. 7A and 7B, the touch panel 502 includes a cover lens 51, a touch-sensing unit 52, a decoration layer 53 and a decoration layer 54. Each of the decoration layers 53 and 54 are disposed between the cover lens 51 and the touch-sensing unit 52. The decoration layer 53 is printed on the conductive surface 521 of the touch-sensing unit 52.

In some embodiments, the decoration layer 54 is printed on the surface 512 of the cover lens 51, and has a predetermined pattern 545 including at least one selected from a group consisting of a black matrix pattern, a logo pattern, an icon pattern and a functional pattern. For instance, the functional pattern includes at least one of an infrared functional pattern and a light-sensor functional pattern. The decoration layers 53 and 54 have an arrangement relationship therebetween being one of a first relationship and a second relationship. The first relationship is that the decoration layer 54 is disposed on the decoration layer 53. For instance, the decoration layer 53 includes a surface 532 facing the surface 512 of the cover lens 51; the decoration layer 54 includes a surface 542 facing the conductive surface 521 of the touch-sensing unit 52; and as shown in FIGS. 7A and 7B, in the first relationship, the surface 542 of the decoration layer 54 is disposed on the surface 532 of the decoration layer 53.

Figure 7C:
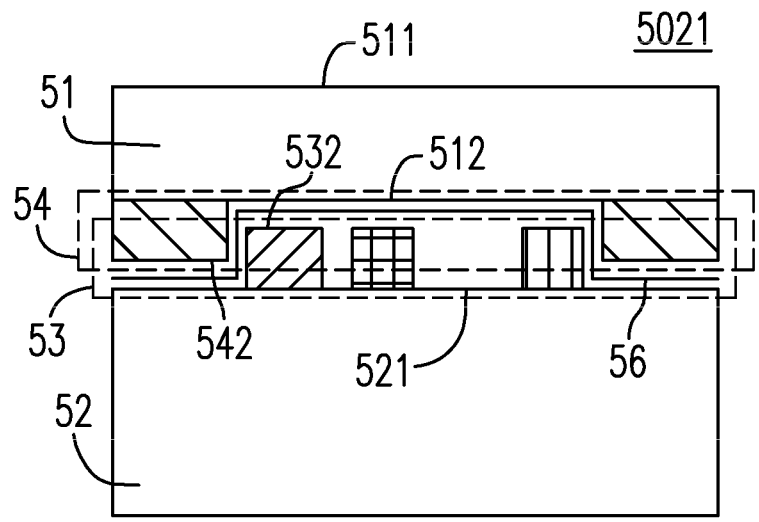
FIG. 7C is a schematic diagram showing an assembly configuration of the touch panel in FIG. 7A.

Please refer to FIG. 7C, which is a schematic diagram showing an assembly configuration 5021 of the touch panel 502 in FIG. 7A. As shown in FIG. 7C, the second relationship is that the decoration layers 53 and 54 are laterally interlaced between the conductive surface 521 of the touch-sensing unit 52 and the surface 512 of the cover lens 51. For instance, in the second relationship, the surface 532 of the decoration layer 53 is higher than the surface 542 of the decoration layer 54, and is lower than or as high as the surface 512 of the cover lens 51; and in the second relationship, the surface 542 of the decoration layer 54 is higher than or as high as the conductive surface 521 of the touch-sensing unit 52, and is lower than the surface 532 of the decoration layer 53. For instance, the surface 531 of the decoration layer 53 and the conductive surface 521 of the touch-sensing unit 52 have the first adhesive force per unit area therebetween; the surface 532 of the decoration layer 53 and the surface 542 of the decoration layer 54 have a third adhesive force per unit area therebetween; and the first adhesive force per unit area is greater than the third adhesive force per unit area. For instance, the touch panel 502 further includes an adhesive layer 56; the adhesive layer 56 is disposed between the cover lens 51 and the decoration layer 53, and causes the cover lens 51 to be adhered to the decoration layers 53. For instance, the adhesive layer 56 is a planarization layer, and is disposed between the decoration layers 53 and 54.

In some embodiments, the combination of the decoration layers 53 and 54 is configured to have a pattern structure. For instance, the pattern structure includes the predetermined patterns 535 and 545. In some embodiments, the pattern structure includes a plurality of types of patterns, such as a black matrix pattern, a logo pattern, an icon pattern and a functional pattern. In some embodiments, the pattern structure includes patterns of a single type. The pattern structure may have a first portion and a second portion. When the plurality of types of patterns simultaneously exist or the patterns of the single type are repetitively distributed, the first portion (such as the predetermined pattern 535) of the pattern structure may be printed on the touch-sensing unit 52, and the second portion (such as the predetermined pattern 545) of the pattern structure may be printed on the cover lens 51.

In some embodiments, the predetermined pattern 535 includes a logo pattern 5351, an icon pattern 5352 and a functional pattern 5353, wherein the logo pattern 5351, the icon pattern 5352 and the functional pattern 5353 have a predetermined position relationship thereamong. For instance, a logo ink, an icon ink and a functional ink are placed on the conductive surface 521 of the touch-sensing unit 52 by a screen printing process; and the logo ink, the icon ink and the functional ink are dried to respectively form the logo pattern 5351, the icon pattern 5352 and the functional pattern 5353. The predetermined pattern 545 includes a black matrix pattern 5451. For instance, a black matrix ink is placed on the surface 512 of the cover lens 51 by a screen printing process; and the black matrix ink is dried to form the black matrix pattern 5451.

In various embodiments provided according to the illustrations in FIGS. 5A, 5B, 6A, 6B, 7A, 7B and 7C, a method for manufacturing a touch panel 502 includes the following steps. A touch-sensing unit 52 is provided. A decoration layer 53 is formed on the touch-sensing unit 52. A cover lens 51 is disposed on the decoration layer 53.

In some embodiments, the cover lens 51 includes a user interface surface 511 and a surface 512 opposite to the user interface surface 511. The method further includes a step of printing a decoration layer 54 on the surface 512 of the cover lens 51. The step of disposing the cover lens 51 includes a sub-step of disposing the decoration layer 54 between the touch-sensing unit 52 and the surface 512 of the cover lens 51 by causing the surface 512 to face the touch-sensing unit 52. The step of forming the decoration layer 53 includes a sub-step of printing the decoration layer 53 on the touch-sensing unit 52 by a screen printing.

In some embodiments, the cover lens 51 and the touch-sensing unit 52 are separated by the decoration layer 53. The decoration layer 53 and the touch-sensing unit 52 have a first adhesive force per unit area therebetween. The decoration layer 53 and the cover lens 51 have a second adhesive force per unit area therebetween. The first adhesive force per unit area is greater than the second adhesive force per unit area.

Figure 8A:
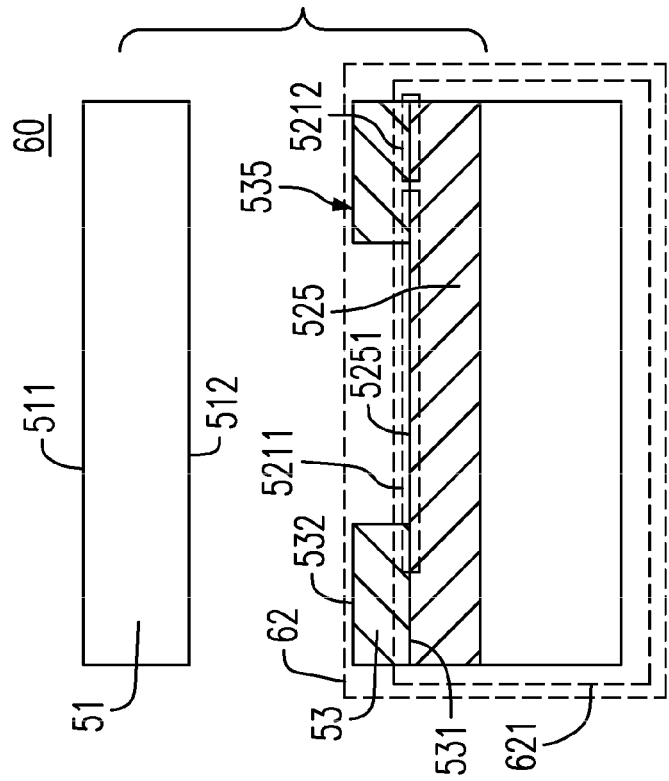
FIG. 8A and FIG. 8B are schematic diagrams respectively showing an assembly form and a resolution form of a touch panel according to various embodiments of the present disclosure.
Figure 8B:
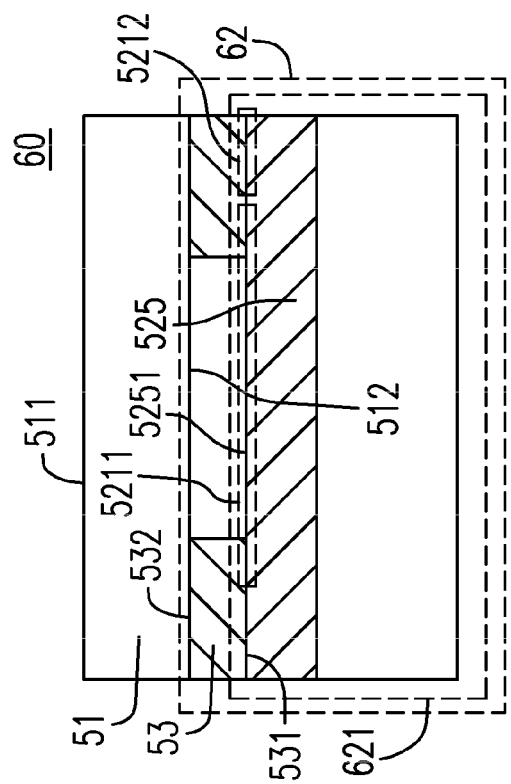

Please refer to FIG. 8A and FIG. 8B, which are schematic diagrams respectively showing an assembly form and a resolution form of a touch panel 60 according to various embodiments of the present disclosure. The touch panel 60 includes a touch-sensing unit 62 and a cover lens 51 coupled to the touch-sensing unit 62. The touch-sensing unit 62 has a conductive layer 525, wherein the conductive layer 525 has an adhering surface 5251, and a decoration layer 53 formed on the adhering surface 5251. The cover lens 51 is disposed on the touch-sensing unit 62, so that the decoration layer 53 is disposed between the cover lens 51 and the conductive layer 525.

In some embodiments, the touch-sensing unit 62 includes a touch-sensing component 621 and a decoration layer 53 formed on the touch-sensing component 621. For instance, the touch-sensing component 621 is the touch-sensing unit 52 shown in FIGS. 5A and 5B, and includes the conductive layer 525; and the adhering surface 5251 is the conductive surface 521 shown in FIGS. 5A and 5B. In FIGS. 8A and 8B, the conductive layer 525 of the touch-sensing unit 62 includes a transparent conductive surface 5211; and the cover lens 51 and the transparent conductive surface 5211 of the conductive layer 525 are separated by the decoration layer 53. The decoration layer 53 is disposed between the cover lens 51 and the conductive layer 525 of the touch-sensing unit 62, and is coupled to each of the cover lens 51 and the conductive layer 525. The decoration layer 53 and the conductive layer 525 of the touch-sensing component 621 have a first adhesive force per unit area therebetween; the decoration layer 53 and the cover lens 51 have a second adhesive force per unit area therebetween; and the first adhesive force per unit area is greater than the second adhesive force per unit area.

In some embodiments, the cover lens 51 includes a user interface surface 511 and a surface 512 opposite to the user interface surface 511. The touch-sensing unit 62 is a film sensor; and the adhering surface 5251 of the touch-sensing unit 62 faces the surface 512 of the cover lens 51. The decoration layer 53 is printed on the adhering surface 5251 of the touch-sensing unit 62, and has a predetermined pattern 535 including at least one selected from a group consisting of a black matrix pattern, a logo pattern, an icon pattern and a functional pattern.

Please refer to FIG. 9A and FIG. 9B, which are schematic diagrams respectively showing an assembly form and a resolution form of a touch panel 601 according to various embodiments of the present disclosure. The structure of the touch panel 601 is similar to that of the touch panel 60 shown in FIGS. 8A and 8B. The differences between the touch panels 601 and 60 are described as follows. In FIGS. 9A and 9B, the touch panel 601 includes a cover lens 51, a touch-sensing unit 62 and a decoration layer 54. The decoration layer 54 is disposed between the cover lens 51 and the touch-sensing unit 62.

In some embodiments, the decoration layer 54 is printed on the surface 512 of the cover lens 51 and has a predetermined pattern 545 including at least one selected from a group consisting of a black matrix pattern, a logo pattern, an icon pattern and a functional pattern. The decoration layer 54 and the decoration layer 53 of the touch-sensing unit 62 have an arrangement relationship therebetween being one of a first relationship and a second relationship. The first relationship is that the decoration layer 54 is disposed on the decoration layer 53. For instance, the decoration layer 53 includes a surface 532 facing the surface 512 of the cover lens 51; the decoration layer 54 includes a surface 542 facing the adhering surface 5251 of the touch-sensing unit 62; and as shown in FIGS. 9A and 9B, in the first relationship, the surface 542 of the decoration layer 54 is disposed on the surface 532 of the decoration layer 53.

Figure 9C:
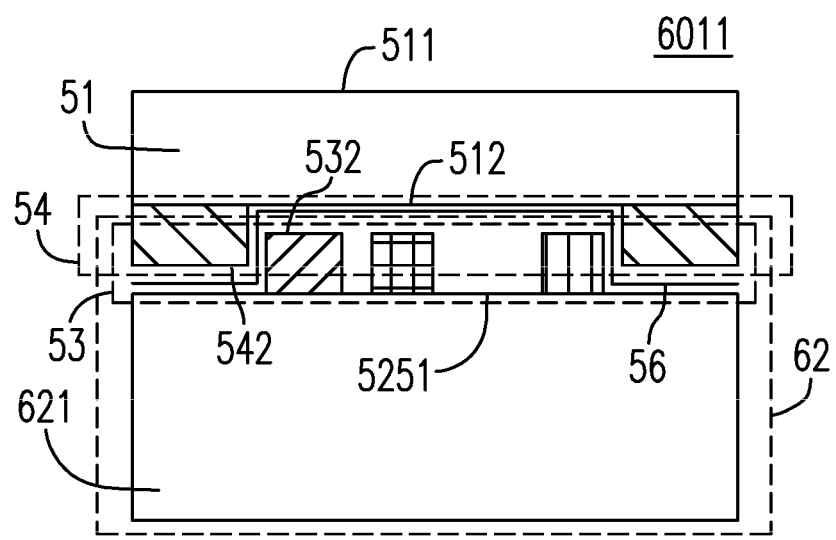
FIG. 9C is a schematic diagram showing an assembly configuration of the touch panel in FIG. 9A.

Please refer to FIG. 9C, which is a schematic diagram showing an assembly configuration 6011 of the touch panel 601 in FIG. 9A. As shown in FIG. 9C, the second relationship is that the decoration layers 53 and 54 are laterally interlaced between the adhering surface 5251 of the touch-sensing unit 62 and the surface 512 of the cover lens 51. For instance, in the second relationship, the surface 532 of the decoration layer 53 is higher than the surface 542 of the decoration layer 54, and is lower than or as high as the surface 512 of the cover lens 51; and in the second relationship, the surface 542 of the decoration layer 54 is higher than or as high as the adhering surface 5251 of the touch-sensing unit 62, and is lower than the surface 532 of the decoration layer 53. For instance, the touch panel 601 further includes an adhesive layer 56; the adhesive layer 56 is disposed between the cover lens 51 and the decoration layer 53, and causes the cover lens 51 to be adhered to the decoration layers 53. For instance, the adhesive layer 56 is a planarization layer, and is disposed between the decoration layers 53 and 54. For instance, the decoration layer 54 is adhered to the decoration layers 53 through the adhesive layer 56.

The touch panels 50, 501, 502, 60 and 601 of the present disclosure have the following features because the decoration layer 53 is directly printed on the touch-sensing unit 52. The precision which a decoration layer 53 is disposed on the touch-sensing unit 52 may be increased; the process yield factor may be raised; the appearance match of the decoration layer 53 may be improved; the production cost may be reduced; and the process timeliness may be raised.

While the disclosure has been described in terms of what is presently considered to be the most practical and preferred embodiments, it is to be understood that the disclosure needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A touch panel, comprising:
    a cover lens;
    a touch-sensing unit; and
    a first decoration layer separating the cover lens from the touch-sensing unit, wherein:
    the first decoration layer and the touch-sensing unit have a first adhesive force per unit area therebetween;
    the first decoration layer and the cover lens have a second adhesive force per unit area therebetween; and
    the first adhesive force per unit area is greater than the second adhesive force per unit area.

2. The touch panel according to claim 1, wherein:
    the cover lens comprises a user interface surface and a first surface opposite to the user interface surface; and
    the touch-sensing unit comprises a conductive surface facing the first surface.

3. The touch panel according to claim 2, wherein the first decoration layer is printed on the conductive surface and has a first predetermined pattern including at least one selected from a group consisting of a black matrix pattern, a logo pattern, an icon pattern and a functional pattern.

4. The touch panel according to claim 2, wherein:
    the first decoration layer comprises a second surface adhered to the conductive surface, and a third surface opposite to the second surface;
    the second surface and the conductive surface have the first adhesive force per unit area therebetween; and
    the third surface and the first surface have the second adhesive force per unit area therebetween.

5. The touch panel according to claim 2, wherein:
    the touch-sensing unit is a film sensor;
    the conductive surface comprises a transparent surface; and
    the cover lens and the transparent surface are separated by the first decoration layer.

6. The touch panel according to claim 2, further comprising a second decoration layer printed on the first surface and having a second predetermined pattern including at least one selected from a group consisting of a black matrix pattern, a logo pattern, an icon pattern and a functional pattern.

7. The touch panel according to claim 6, wherein:
    the first and the second decoration layers have an arrangement relationship therebetween being one of a first relationship and a second relationship;
    the first relationship is that the second decoration layer is disposed on the first decoration layer; and
    the second relationship is that the first and the second decoration layers are laterally interlaced between the conductive surface and the first surface.

8. A touch panel, comprising:
    a touch-sensing unit having a conductive layer, wherein the conductive layer has an adhering surface, and a first decoration layer formed on the adhering surface; and
    a cover lens disposed on the touch-sensing unit, so that the first decoration layer is disposed between the cover lens and the conductive layer, wherein the first decoration layer and the conductive layer have a first adhesive force per unit area therebetween;
    the first decoration layer and the cover lens have a second adhesive force per unit area therebetween; and
    the first adhesive force per unit area is greater than the second adhesive force per unit area.

9. The touch panel according to claim 8, wherein the conductive layer comprises a transparent surface, and the cover lens and the transparent surface are separated by the first decoration layer.

10. The touch panel according to claim 8, wherein the first decoration layer is printed on the adhering surface and has a first predetermined pattern including at least one selected from a group consisting of a black matrix pattern, a logo pattern, an icon pattern and a functional pattern.

11. The touch panel according to claim 8, wherein:
the touch-sensing unit is a film sensor;
the cover lens comprises a user interface surface and a first surface opposite to the user interface surface; and
the adhering surface faces the first surface.

12. The touch panel according to claim 11, further comprising a second decoration layer, wherein the second decoration layer is printed on the first surface and has a second predetermined pattern including at least one selected from a group consisting of a black matrix pattern, a logo pattern, an icon pattern and a functional pattern.

13. The touch panel according to claim 12, wherein:
the first and the second decoration layers have an arrangement relationship therebetween being one of a first relationship and a second relationship;
the first relationship is that the second decoration layer is disposed on the first decoration layer; and
the second relationship is that the first and the second decoration layers are laterally interlaced between the adhering surface and the first surface.

14. A method for manufacturing a touch panel, comprising steps of:
providing a touch-sensing unit;
forming a first decoration layer on the touch-sensing unit; and
disposing a cover lens on the first decoration layer, wherein the first decoration layer and the touch-sensing unit have a first adhesive force per unit area therebetween;
the first decoration layer and the cover lens have a second adhesive force per unit area therebetween; and
the first adhesive force per unit area is greater than the second adhesive force per unit area.

15. The method according to claim 14, wherein:
the cover lens includes a user interface surface and a first surface opposite to the user interface surface; and
the method further comprises a step of printing a second decoration layer on the first surface.

16. The method according to claim 15, wherein the step of disposing the cover lens comprises a sub-step of disposing the second decoration layer between the touch-sensing unit and the first surface by causing the first surface to face the touch-sensing unit.

17. The method according to claim 14, wherein the step of forming the first decoration layer comprises a sub-step of printing the first decoration layer on the touch-sensing unit by a screen printing.

18. The method according to claim 14, wherein the cover lens and the touch-sensing unit are separated by the first decoration layer.

\* \* \* \* \*